United States Patent [19]

Schaefer

[11] 4,427,153
[45] Jan. 24, 1984

[54] PLURAL COMPONENT DISPENSING DEVICE

[75] Inventor: Thomas J. Schaefer, Buffalo, Minn.

[73] Assignee: Graco Inc., Minneapolis, Minn.

[21] Appl. No.: 408,425

[22] Filed: Aug. 16, 1982

[51] Int. Cl.³ .............................................. B05B 7/04
[52] U.S. Cl. .................................. 239/117; 239/404; 239/415; 239/528; 239/600
[58] Field of Search .............................. 239/114–118, 239/404, 414, 415, 417.5, 527, 528, 416.4, 600, 427.3

[56] References Cited

U.S. PATENT DOCUMENTS

| Re. 29,665 | 6/1978 | Gusmer et al. | 239/414 |
|---|---|---|---|
| 1,402,268 | 1/1922 | Swanda | 239/427.3 |
| 2,890,836 | 6/1959 | Gusmer et al. | 239/117 |
| 2,910,248 | 10/1959 | Kueter et al. | 239/415 |
| 3,144,210 | 8/1964 | Levy | 239/116 |
| 3,263,928 | 8/1966 | Gusmer | 239/414 |
| 3,687,370 | 8/1972 | Sperry | 239/117 |
| 3,690,556 | 9/1972 | McCain | 239/117 |
| 3,799,403 | 3/1974 | Probst et al. | 239/414 |
| 4,023,733 | 5/1977 | Sperry | 239/117 |
| 4,133,483 | 1/1979 | Henderson | 239/118 |
| 4,159,079 | 6/1979 | Phillips, Jr. | 239/118 |

*Primary Examiner*—John J. Love
*Assistant Examiner*—Michael J. Forman
*Attorney, Agent, or Firm*—Paul L. Sjoquist

[57] ABSTRACT

A plural component dispensing nozzle having internal passages for the introduction of at least two components for mixing and dispensing, and having a one piece mixing chamber with impingement orifices axially spaced along the chamber, and having formed as a part thereof sealing flanges to develop the fluid flow passages into the mixing chamber, and to provide an isolation seal between the plural components as well as fluid seals between the flow passages and the nozzle.

38 Claims, 7 Drawing Figures

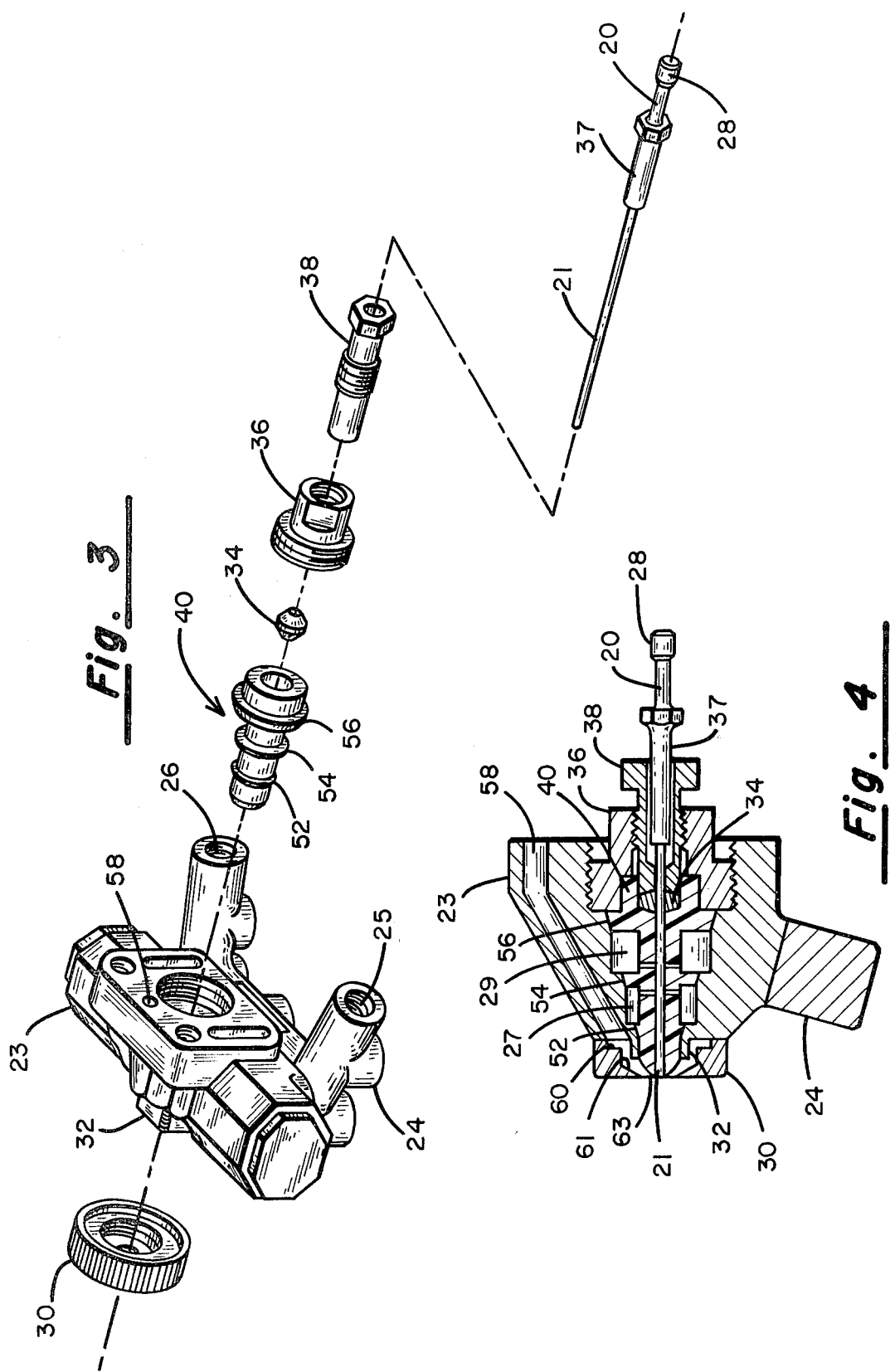

PLURAL COMPONENT DISPENSING DEVICE

BACKGROUND OF THE INVENTION

The present invention relates generally to plural component dispensing devices, and more specifically to a spray gun for applying chemically reactive plural components while maintaining fluid isolation between the components to the point where they are introduced into a common mixing chamber for spraying.

The field relating to the spraying and dispensing of chemically reactive liquid components presents particularly difficult design problems for the dispensing nozzle, because the respective components must be maintained in complete fluid isolation up to the moment of spraying or dispensing. Typically, plural components of the type relating to the present invention comprise a resin component which is chemically inert in isolated form and an isocyanate material which is also chemically inert in isolated form. When the isocyanate and resin are combined an immediate chemical reaction begins taking place and, depending upon the selection of materials, typically results in a relatively fast solidifying process of the mixed materials. Industrial foams for packaging, insulation, and other uses are usually formed in this manner, and upon hardening they become solid materials. If the hardening process occurs within the spray gun or dispenser the various passages and ports will become clogged and blocked by the materials and the spraying or dispensing device will be totally disabled. Further, the task of cleaning such materials from internal passages and ports of a spraying device is extremely difficult, and in many cases the device must be completely rebuilt or replaced.

Prior art devices have addressed the problem of mixing and dispensing chemically reactive components with varying degrees of success. U.S. Pat. No. 2,890,836, issued June 16, 1959 discloses a mixing chamber placed proximate a spray orifice, having a slidable plunger therein for completely closing the mixing chamber and spray orifice in a first position and for opening diametrically displaced jets into the mixing chamber in a rearward position. Because of the extremely short distance between the mixing chamber and the spray orifice, this device is susceptible of imperfect mixing. U.S. Pat. No. 3,144,210, issued Aug. 11, 1964, discloses a mixing chamber having axially displaced inlet ports, one set of ports comprising a plurality of passages tangentially aligned to the mixing chamber and normal to the axis of the mixing chamber; the second set of inlet ports comprising tangentially aligned ports with respect to the mixing chamber, but angled in a forward direction with respect to the spray nozzle. U.S. Pat. No. 3,263,928, issued Aug. 2, 1966, discloses a mixing chamber having axially aligned but diametrically displaced ports, wherein the mixing chamber is formed of two identical half-circle parts, and wherein packing sleeves are axially compressed on either side of the mixing chamber. U.S. Pat. No. 3,799,403, issued Mar. 26, 1974, discloses a movable mixing chamber which is positionable to accept a purging gas upon termination of the dispensing operation. U.S. Pat. No. Re. 29,665, reissued June 13, 1978 discloses a mixing chamber having axially displaced inlet ports, and having a narrowed throat axially intermediate the inlet ports, and having a movable plunger arranged for interference fit with the throat. U.S. Pat. No. 4,133,483, issued Jan. 9, 1979, discloses an independently actuable purging rod slidably displaced in the mixing chamber, which may be retracted for admitting solvent or air purging materials.

The foregoing patents suffer from problems relating to imperfect fluid isolation seals, inadequate mixing chambers, and unreliable purging of the mixed components at the termination of the spraying operation, unless solvent or other purging gases are utilized for cleaning. Further, in many cases the sealing problems require complex constructions of seals in combination with the mixing chamber in order to attempt to obtain an adequate solution. There is a need for a mixing chamber construction which is both simple and efficient, and which requires a minimum number of complex parts for construction.

It is the principal object of the present invention to provide a spray gun nozzle having a simple and effective mixing chamber, with positive fluid seals for maintaining liquid isolation of the respective components. It is another object of the invention to provide a spray gun nozzle for a plural component dispensing device which is simple to disassemble for cleaning.

It is further object of the present invention to provide a one piece spray gun mixing chamber having precisely positioned inlet orifices for passage of at least two liquid components, and having thereon liquid sealing members to provide isolation between the components.

SUMMARY OF THE INVENTION

This invention comprises a spray gun nozzle for the spraying or dispensing of at least two liquid components, preferably of the chemically reactive type, including a one piece mixing chamber having axially displaced inlets for receiving two liquid components, and having sealing flanges for providing sealing isolation of the respective components external to the mixing chamber, and having further sealing flanges for preventing leakage of either of the liquid components outside of the spray nozzle.

BRIEF DESCRIPTION OF THE DRAWINGS

The foregoing and other objects will become apparent upon a reading of the attached specification, and with reference to the appended drawings, in which;

FIG. 3 shows an exploded view of the nozzle and its components; and FIG. 4 shows a vertical cross section view of the nozzle taken along the lines 4—4 of FIG. 2.

DESCRIPTION OF THE PREFERRED EMBODIMENT

Figure 1:
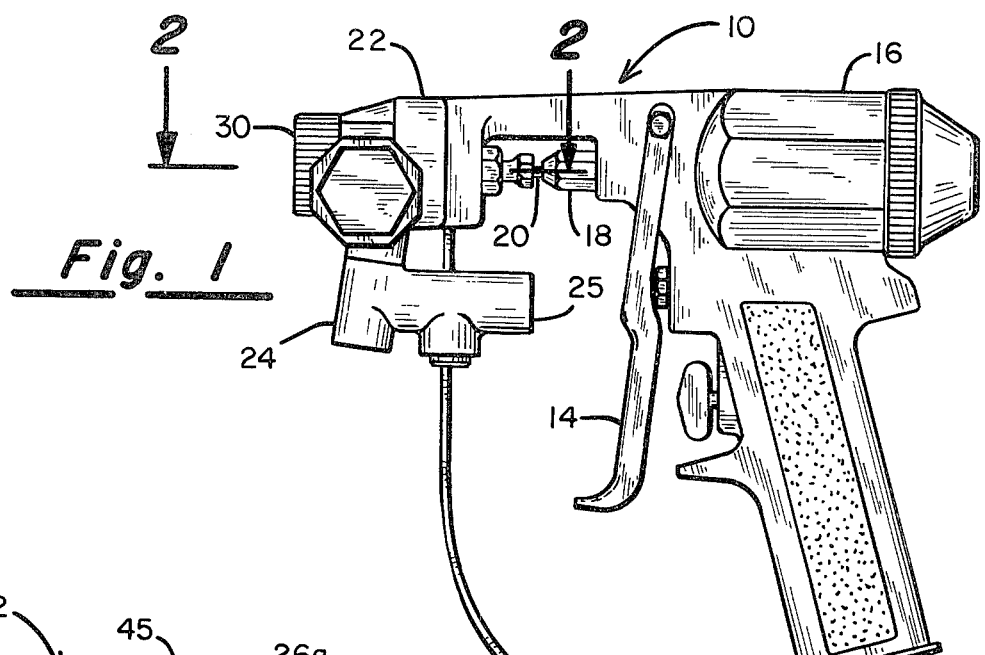
FIG. 1 shows a spray gun of the type incorporating the present invention.

Referring first to FIG. 1, there is shown a spray gun 10 adapted for incorporation of the present invention. Spray gun 10 has an inlet 12 for connection to a source of pressurized air, and a trigger 14 for actuation of the spray gun. When trigger 14 is depressed an air valve is opened to cause actuation of a piston in air cylinder 16. The piston in air cylinder 16 is connected to a piston rod 18, which moves in coincidence with the piston. Piston rod 18 is coupled to a valve rod 20 which is retractively slidable within nozzle 22. All of the construction features of spray gun 20, with the exception of the novel features to be hereinafter described with reference to nozzle 22, may be considered to be well-known in the prior art. Nozzle 22 has attached thereto a liquid inlet manifold 24, which itself has two liquid inlets 25 and 26 for connection respectively to two different liquid component sources.

Figure 2:
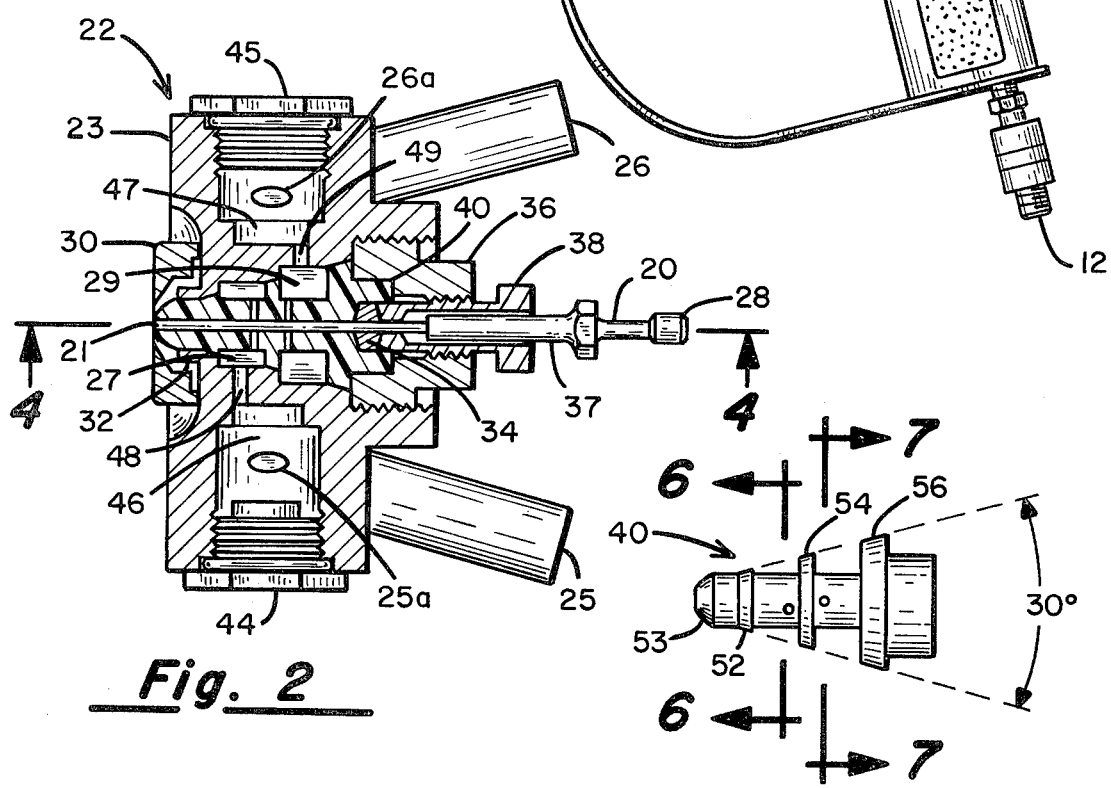
FIG. 2 shows a horizontal cross section view of the spray nozzle taken along the lines 2—2 of FIG. 1.

FIG. 2 shows a horizontal cross section view of nozzle 22, along the lines 2—2 of FIG. 1, having valve rod 20 projecting therefrom. Valve rod 20 has affixed to its end a ball connection 28 which is adapted for detachable seating within a mating socket in piston rod 18. Nozzle 22 has a housing 23, which has a cap 30 threadably attached to its front end, and has internal passages and components to be hereinafter described. Cap nut 44 sealably closes an internal passage 46, which passage 46 is in flow communication with inlet passage 25 via passage 25a. Similarly, cap nut 45 sealably closes a passage 47 which is in flow communication with inlet passage 26 via passage 26a. A forwardly offset passage 48 provides flow communication between passage 46 and the exterior surface area of mixing chamber 40 which is sealably defined by flanges 52 and 54. Similarly, a rearwardly offset passage 49 provides flow communication between passage 47 and the exterior surface of mixing chamber 40 which is sealably defined by flanges 54 and 56. Thus, an isolated flow path is provided between liquid inlet 25 and a circumferential passage 27 surrounding mixing chamber 40, and defined axially by flanges 52 and 54. Similarly, an isolated flow passage is provided between liquid inlet 26 and a circumferential passage 29 surrounding mixing chamber 40 which is axially defined by flanges 54 and 56.

FIG. 3 shows nozzle 22 and its associated components in exploded view. Cap 30 is threadably attached to a square shank 32 which has threads cutting through its respective corners for tightening cap 30 against the front of housing 23. A mixing chamber 40 is seated within housing 23, as may be better viewed with reference to FIG. 2 and FIG. 4. A retaining nut 36 is threadably attached in housing 23 behind mixing chamber 40 and seal 34. A packing nut 38 is threadably attached into retaining nut 36. Packing nut 38 slidably accepts bushing 37 which is affixed to valve rod 20 at one of its ends, and is affixed to plunger 21 at its other end. Plunger 21 axially slides through retaining nut 36 and packing nut 38, seal 34, and mixing chamber 40.

FIG. 4 shows a vertical cross section through nozzle 22 taken along the lines 4—4 of FIG. 2. Housing 23 has an inner chamber which is machined to sealably accept mixing chamber 40. Retaining nut 36 is threadably attached to housing 23 and is adjusted to sealably compress mixing chamber 40 to provide sealing engagement between flanges 52, 54 and 56 against the inside chamber surfaces of housing 23. Packing nut 38 is threadably attached inside retaining nut 36, to sealably engage seal 34 against plunger 21. Bushing 37 is slidably movable within packing nut 38. An internal liquid passage 27 is created by the internal void which is defined by the exterior circumferential surface of mixing chamber 40 between axially displaced flanges 52 and 54, and the interior machined surface of housing 23. A second liquid passage 29 is defined by the exterior circumferential surface of mixing chamber 40 between axially displaced flanges 54 and 56, and the interior machined surface of housing 23. Passages 27 and 29 come into flow communication with an inner axial passage of mixing chamber 40 which is created when plunger 21 is retracted from mixing chamber 40. This flow communication is provided by a plurality of small passages drilled through mixing chamber 40 in the region of the respective passages 27 and 29.

FIG. 4 also illustrates a further feature of the present invention, which permits the passages of purging and cleaning air to the region surrounding the front end of plunger 20. A passage 58 is formed within housing 23, and is in alignment with an air passage through spray gun 10 (not shown) which is in flow communication with air inlet 12. Passage 58 communicates with an axial bore 60 in cap 30, which bore 60 is cut to a predetermined depth within cap 30. A further axial bore 61 is cut to a deeper depth in cap 30, to provide an air communication path through the flat surfaces of square shank 32, to an annular slot 63 opening adjacent the front of mixing chamber 40. Axial bores 60 and 61 respectively provide an air flow path across all four of the flat surfaces of square shank 32, thereby permitting an annular air passage through annular slot 63.

Figure 5:
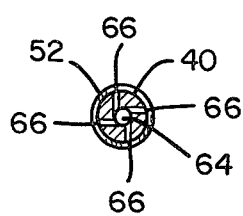
FIG. 5 shows the mixing chamber.

FIG. 5 shows a side view of mixing chamber 40, illustrating the relationships between the flanges 52, 54 and 56. The front edge 53 of mixing chamber 40 is tapered or rounded to assist in providing the aforementioned annular slot 63 for air flow. Flanges 52, 54 and 56 are axially displaced along mixing chamber 40, but all have exterior flange surfaces arranged at a common conical angular displacement. This angular displacement is preferably 30°, as is illustrated in FIG. 5, but mixing chamber 40 may be designed to accommodate a different flange displacement angle.

Figure 6:
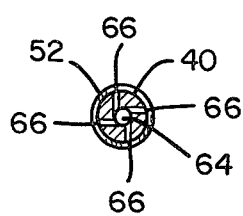
FIG. 6 shows a view taken along the line 6—6 of FIG. 5.

FIG. 6 shows a cross section view of mixing chamber 40 taken along the line 6—6 of FIG. 5. A central axial bore 64 is sized to sealably accept plunger 21, which is typically constructed of a hardened alloy steel pin. The plurality of passages 66 are drilled between the exterior surface of mixing chamber 40 and bore 64, being tangentially aligned to bore 64 as is shown in FIG. 6. In the preferred embodiment four such passages 66 have been selected, although fewer or greater passages may be chosen. The size of passages 66 is determined by the type of liquid being dispensed by the spray gun, the volume quantity desired for dispensing, and the degree of mixing action desired within mixing chamber 40.

Figure 7:
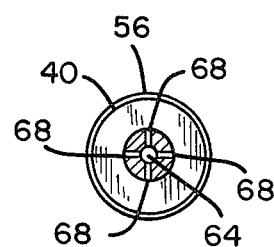
FIG. 7 shows a view taken along the line 7—7 of FIG. 5.

FIG. 7 shows a cross section view of mixing chamber 40 taken along the line 7—7 of FIG. 5. A plurality of passages 68 are drilled through the exterior surface of mixing chamber 40 in the region defined between flanges 54 and 56, and central bore 64. Passages 68 are preferably radially directed relative to bore 64, and the number and size of passages 68 is determined by the parameters described hereinbefore.

In operation, a source of pressurized air is coupled to spray gun 10 at inlet 12, and suitable liquid components are coupled to inlets 25 and 26. When trigger 14 is depressed plunger 21 becomes retractably removed from the central bore 64 in mixing chamber 40, and the liquid components are admitted into central bore 64 respectively through passages 66 and 68. The liquid admitted through passages 66, typically an isocyanate, create a tangential vortex or swirl in bore 64, while the liquid admitted through passages 68, typically a resin, create a violent turbulent mixing action within bore 64. The respective components are thereby thoroughly mixed, and pass forwardly through bore 64 until they are ejected from the front opening to mixing chamber 40.

The swirl action of the liquids makes the mixed liquids bloom into a circular spray pattern having uniform liquid component distribution throughout. Upon releasing trigger 14, plunger 21 first closes passages 68 to shut off the liquid therefrom, and then closes passages 64 to shut off the liquid therefrom. As trigger 14 is further released, plunger 21 forceably ejects all liquid from within bore 64 through the front of mixing chamber 40. The annular air which is emitted around the front opening of bore 64 purges the last remaining mixed liquid components from the front end of plunger 21 and mixing chamber 40, thereby assuring a clean removal of all mixed liquid components.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A liquid spray nozzle for receiving at least two liquid components for mixing and dispensing, comprising
   (a) a nozzle housing having inlets for separately receiving said liquid components, and having an internal passage therethrough along an axis, and having passages respectively coupling each of said inlets to axially spaced openings into said internal passage;
   (b) a mixing chamber member axially positioned in said nozzle housing internal passage, said member having axially spaced raised flanges sealably isolating respective axially spaced openings to create axially positioned circumferential passages, said mixing chamber member having an axial bore therethrough and having internal passages communicating between said axial bore and respective ones of said axially positioned circumferential passages; and
   (c) a retractable plunger sealably fitted in said mixing chamber member axial bore.

2. The apparatus of claim 1, wherein said mixing chamber internal passages further comprise a first set of passages at a first axial position radially directed from said axial bore to one of said circumferential passages, and a second set of passages at a second axial position non-radially directed from said axial bore to a second of said circumferential passages.

3. The apparatus of claim 2, wherein said axially spaced raised flanges further comprise three flanges of successively increasing size along said axis.

4. The apparatus of claim 3, wherein said flanges each have edge surfaces tapered along a common solid angle.

5. The apparatus of claim 4, wherein said mixing chamber first and second internal sets of passages are respectively located adjacent opposite sides of the central of said three flanges.

6. The apparatus of claim 5, wherein said retractable plunger is movable from a first position totally closing said axial bore to a second position opening all of said mixing chamber internal passages.

7. The apparatus of claim 1, wherein said axially spaced raised flanges further comprise three flanges of successively increasing size along said axis.

8. The apparatus of claim 7, wherein said flanges each have edge surfaces tapered along a common solid angle.

9. The apparatus of claim 8, wherein said mixing chamber internal passages further comprise a first set of passages at a first axial position radially directed from said axial bore to one of said circumferential passages, and a second set of passages at a second axial position tangentially directed from said axial bore to a second of said circumferential passages.

10. The apparatus of claim 9, wherein said mixing chamber first and second internal sets of passages are respectively located adjacent opposite sides of the central of said three flanges.

11. The apparatus of claim 1, wherein said retractable plunger is movable from a first position totally closing said axial bore to a second position opening all of said mixing chamber internal passages.

12. The apparatus of claim 11, wherein said axially spaced raised flanges further comprise three flanges of successively increasing size along said axis.

13. The apparatus of claim 12, wherein said flanges each have edge surfaces tapered along a common solid angle.

14. The apparatus of claim 13, wherein said mixing chamber internal passages further comprise a first set of passages at a first axial position radially directed from said axial bore to one of said circumferential passages, and a second set of passages at a second axial position tangentially directed from said axial bore to a second of said circumferential passages.

15. The apparatus of claim 14, wherein said mixing chamber first and second internal sets of passages are respectively located adjacent opposite sides of the central of said three flanges.

16. The apparatus of claim 1, wherein said mixing chamber member further comprises a single material construction.

17. The apparatus of claim 1, wherein said molded material further comprises plastic.

18. The apparatus of claim 16, wherein said axially spaced raised flanges further comprise three flanges of successively increasing size along said axis.

19. The apparatus of claim 18, wherein said flanges each have edge surfaces tapered along a common solid angle.

20. The apparatus of claim 19, wherein said mixing chamber internal passages further comprise a first set of passages at a first axial position radially directed from said axial bore to one of said circumferential passages, and a second set of passages at a second axial position tangentially directed from said axial bore to a second of said circumferential passages.

21. The apparatus of claim 20, wherein said mixing chamber first and second internal sets of passages are respectively located adjacent opposite sides of the central of said three flanges.

22. A mixing chamber and nozzle assembly for mixing and dispensing at least two liquid components, comprising:
   (a) a nozzle housing having an internal opening therethrough symmetrically displaced about an axis, and having means for separately coupling to respective different liquid components and internal nozzle passages for delivering said liquid components to said internal opening at respective different axial positions;
   (b) a mixing chamber member axially positioned in said housing internal opening, said member having circumferential raised flanges sealably contacting said nozzle housing at respective different axial positions bracketing said internal nozzle passages opening into said housing, thereby forming circumferential passages between said mixing chamber and said housing, said mixing chamber having an axial bore therethrough and at least one passage communicating between said axial bore and each of said circumferential passages; and (c) a retractable plunger sealably fitted in said mixing chamber axial bore.

23. The apparatus of claim 22, wherein said circumferential flanges each further comprise a conical edge surface engageable against said housing.

24. The apparatus of claim 23, wherein said flanges further comprise three flanges of successively increasing size along said axis.

25. The apparatus of claim 24, wherein all of said flanges have respective conical edge surfaces aligned along a common solid angle.

26. The apparatus of claim 25, wherein said solid angle is approximately thirty degrees.

27. The apparatus of claim 24, wherein said mixing chamber passages communicating between said axial bore and said circumferential passages further comprise a first set of radial passages from said axial bore to one of said circumferential passages and opening into said circumferential passage adjacent a first side of the middle of said three flanges; and a second set of tangential passages from said axial bore to another of said circumferential passages and opening into said other circumferential passage adjacent a second side of the middle of said three flanges.

28. The apparatus of claim 27, wherein all of said flanges have respective conical edge surfaces aligned along a common solid angle.

29. The apparatus of claim 28, wherein said solid angle is approximately thirty degrees.

30. The apparatus of claim 29, wherein said first set of radial passages further comprise four equally spaced passages.

31. The apparatus of claim 30, wherein said second set of tangential passages further comprise four equally spaced passages.

32. The apparatus of claim 22, wherein said mixing chamber passages communicating between said axial bore and said circumferential passages further comprise a first set of radial passages from said axial bore to one of said circumferential passages, and a second set of non-radial passages from said axial bore to another of said circumferential passages.

33. The apparatus of claim 32, wherein said first set of radial passages further comprise four equally spaced passages.

34. The apparatus of claim 33, wherein said second set of tangential passages further comprise four equally spaced passages.

35. The apparatus of claim 32, wherein said circumferential flanges each further comprise a conical edge surface engageable against said housing.

36. The apparatus of claim 35, wherein said flanges further comprise three flanges of successively increasing size along said axis.

37. The apparatus of claim 36, wherein all of said flanges have respective conical edge surfaces aligned along a common solid angle.

38. The apparatus of claim 37, wherein said solid angle is approximately thirty degrees.

* * * * *